(12) United States Patent
Royston

(10) Patent No.: US 10,170,218 B2
(45) Date of Patent: Jan. 1, 2019

(54) IGNITION SUPPRESSION CIRCUITING TECHNOLOGY

(71) Applicant: Clifton Royston, Houston, TX (US)

(72) Inventor: Clifton Royston, Houston, TX (US)

(73) Assignee: ISCT LLC, Madisonville, LA (US)

( * ) Notice: Subject to any disclaimer, the term of this patent is extended or adjusted under 35 U.S.C. 154(b) by 22 days.

(21) Appl. No.: 14/913,959

(22) PCT Filed: Feb. 22, 2016

(86) PCT No.: PCT/US2016/018978
§ 371 (c)(1),
(2) Date: Feb. 23, 2016

(87) PCT Pub. No.: WO2016/134379
PCT Pub. Date: Aug. 25, 2016

(65) Prior Publication Data
US 2017/0345527 A1 Nov. 30, 2017

Related U.S. Application Data

(60) Provisional application No. 62/119,004, filed on Feb. 20, 2015.

(51) Int. Cl.
*H01B 7/295* (2006.01)
*H02G 3/04* (2006.01)
*A62C 3/16* (2006.01)

(52) U.S. Cl.
CPC .............. *H01B 7/295* (2013.01); *H02G 3/04* (2013.01); *H02G 3/0412* (2013.01); *H02G 3/0481* (2013.01); *A62C 3/16* (2013.01)

(58) Field of Classification Search
CPC combination set(s) only.
See application file for complete search history.

(56) References Cited

U.S. PATENT DOCUMENTS

| 729,935 | A | * | 6/1903 | Maccormac | B62M 27/02 180/189 |
|---|---|---|---|---|---|
| 2,382,120 | A | * | 8/1945 | White | H01B 7/295 169/57 |
| 3,179,181 | A | * | 4/1965 | Candido | A62C 3/00 169/13 |
| 3,865,967 | A | * | 2/1975 | Pritchett | G01M 3/181 174/11 R |
| 4,836,290 | A | * | 6/1989 | Le Lande, Jr. | A62C 35/62 169/11 |
| 6,655,302 | B1 | * | 12/2003 | Ross | G07F 19/20 109/10 |
| 2010/0132964 | A1 | * | 6/2010 | Whitney | A62C 3/008 169/56 |

* cited by examiner

*Primary Examiner* — William H Mayo, III
*Assistant Examiner* — Krystal Robinson
(74) *Attorney, Agent, or Firm* — Donn K. Harms

(57) ABSTRACT

A cable system is provided which is configured with both electric wires and a fluid conduit running through the axial passage of a surround sheath of the cable. The system allows for communication of electricity over the wires for electrical circuits and concurrent communication of a fire ignition suppressant fluid or gas through the fluid conduit, to all points in an electric circuit using the cable. Suppressant chambers may be located in junction boxes in such circuits to locally extinguish electrical fires.

25 Claims, 10 Drawing Sheets

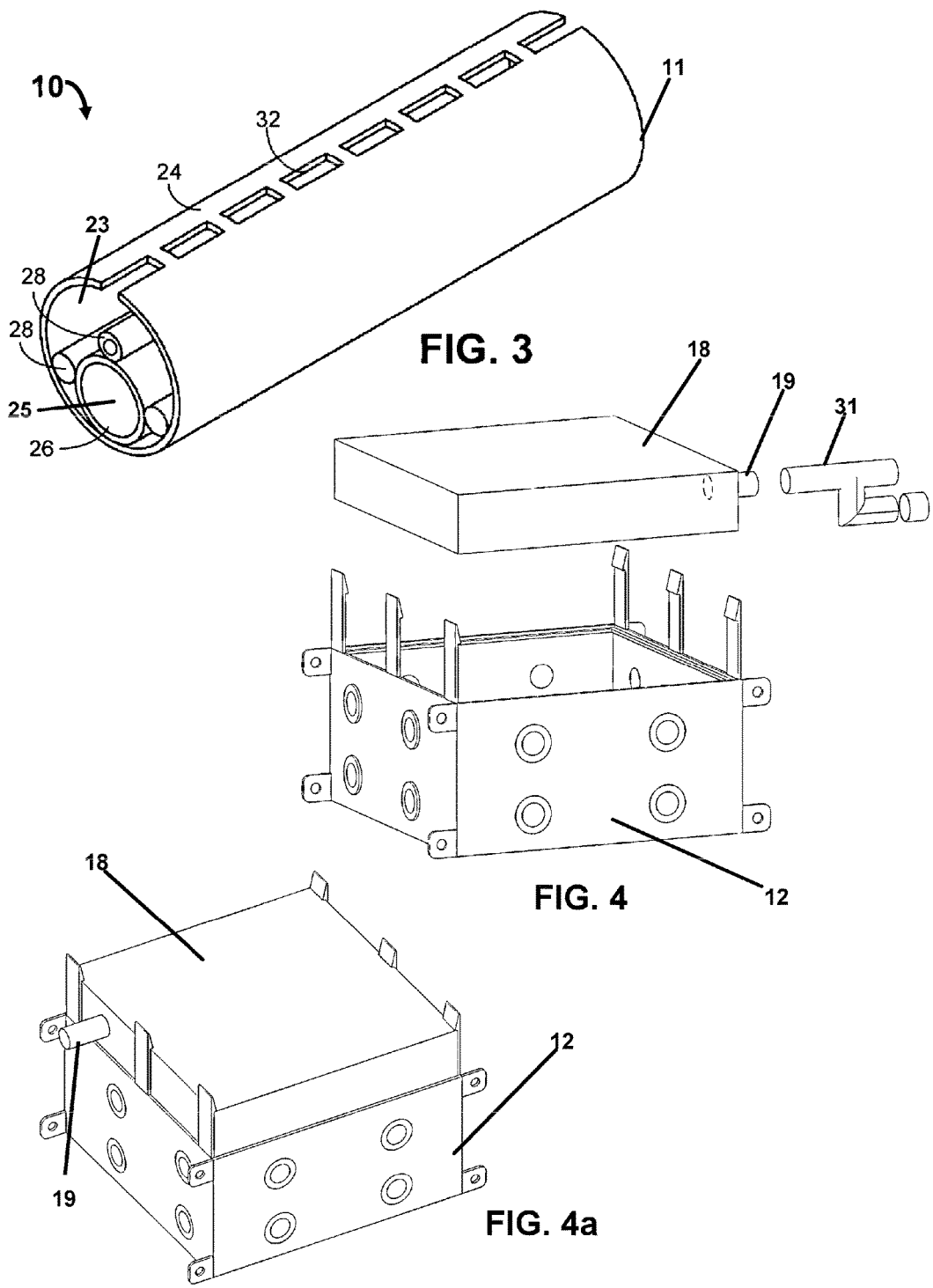

IGNITION SUPPRESSION CIRCUITING TECHNOLOGY

This Application claims priority to U.S. Provisional Patent Application Ser. No. 62/119,004, filed on Feb. 20, 2015, which is included herein in its entirety by this reference thereto.

FIELD OF THE INVENTION

The present device relates to electric systems using cable which employed throughout the world for communication of electric wires from a buss to individual outlets and connections, as well as communications and other cabling systems. More particularly, the disclosed device and method relate to a cabling system including both electrical and/or communications wiring in concert with an adjacent fluid conduit employable for communication of a fire ignition suppressant fluid or gas such as Halon, through the entire cabling system between a main panel and junction boxes and electrical connection points along the conduit system.

BACKGROUND OF THE INVENTION

Electricity delivery systems in buildings in the U.S. and most of the world, have evolved for safety and servicing reasons, to employ metal or polymeric conduits which provide a pathway therethrough for electrical wiring. Such wiring is employed for carrying current from a buss to individual sockets and connectors for equipment requiring electrical power and in other configurations for communications cables running between points. Running the electric and other wiring through a system of conduits protects it from wear over years of use and additionally provides access to retrofit or run new wiring subsequent to the completion of the walls of a structure which will encase the wiring therein. Such conduit in some instances is employed for shielding the contained wiring from EMF which can be generated by wires carrying electricity and electrical signals.

Electricity is conventionally run in individual circuits from a connection to the grid through a circuit breaker connected to a central buss or other main connection. From the circuit breaker connection to the central buss the electric wiring extends in a circuit, to one or a plurality of remote connectors to which equipment requiring electricity engages. Such circuits may include junction boxes and other connectors downstream. By junction boxes is meant any box or mounting component adapted for joining wires or engaging sockets or lighting or any electrical box used for any such purpose.

The connection to components using electricity conventionally engages the appliance or device requiring electrical power, to the circuit, using sockets and junction boxes and switches which can also connect with light fixtures and other components of conventional electric systems. For safety reasons, each individual electrical circuit is conventionally wired to carry electricity at a particular amperage load the equipment or devices anticipated to connect to the circuit will require during use. This is generally accomplished by increasing or decreasing the diameter or size of the wires running through the electrical conduits for larger or smaller current requirements for the equipment connecting to the respective circuit. This wire size requirement is also adjusted by the distance the circuit will travel from the connection to a circuit breaker at the main buss or junction box.

A circuit breaker or fuse conventionally connects each circuit to the buss which is engaged to the power grid. The circuit breaker is generally sized to trip or open to open the circuit, should the amperage load being drawn by equipment connected to points along the circuit exceed the designed electrical load of the wiring for the circuit. Thus, the circuit breaker supplying a circuit will have a maximum amperage rating that will cause the circuit breaker to open should the electric load being drawn by equipment engaged to that circuit exceed the amperage rating of the circuit breaker.

This safeguard, designed into electric systems, is an important factor in preventing circuit overload and resulting fires which such can cause. In many instances an electrical fire caused by a circuit drawing excess electric current can be catastrophic such as in a high rise building, a hospital, or on a ship far from port where a fire can threaten the lives of all aboard.

However, even the best designed electrical system is not a total safeguard from an electrical fire caused by circuit overload, overheating at junctions or sockets, loose connectors, or damaged electric lines and the like. For example, loose connections at a socket or wire connection in a junction box, will not cause an overload of current which will trip a circuit breaker. However, loose connections can generate substantial heat and in some cases sparks, which can ignite adjacent flammable materials in walls and ceilings and the like.

Further, over time, by accident or design, circuit breakers can be replaced with replacement breakers having amperage ratings exceeding the circuit they supply. Such can easily occur during maintenance when a circuit breaker is replaced with one of higher amperage due to the installed circuit breaker constantly tripping. While electricians would not make such a replacement, untrained personnel, owners and tenants, are well known for implementing such a fix.

Installing circuit breakers which have current ratings which exceed that anticipated in the circuit can easily result in overheating of wiring along the circuit in places hidden from discovery such as in within conduits or junction boxes. This is caused by the circuit feeding electricity to more equipment on the circuit with a sum amperage being used which exceeds that for which the circuit was designed. Further, loose connections along the circuit which cause heating to occur during normal with the correct breaker in the circuit, will emit heat which is significantly increased should the circuit draw more current than the maximum design. Such heating frequently occurs in junction boxes where multiple wires are engaged by wire nuts or in boxes housing electrical sockets and the like.

Additionally, connectors such as sockets and switches can over time become damaged or loose from the wire supplying them, or engaged in a manner which causes heating within the conduits and junction boxes. Again such occurs out of sight by users and inspectors, but adjacent flammable wood or plastic or insulation materials in walls and floors.

Such overheating of wiring in a junction box, or wall box holding an electrical socket or switch can thus easily become an ignition source and the cause of a fire. This is especially dangerous since with the heat generated by loose connections or wires running electricity exceeding the wire capacity, continues for the duration of the ongoing communication of electrical current to the circuit. Thus, not only does the wiring become hot enough to ignite the insulation covering the wires, or the walls, ceilings, floors, and other adjacent flammable materials, this heat continues as long as the circuit is powered, and even after a fire has erupted in most cases.

Of course, such an ignition source and resulting fire is hidden and extremely hard to initially detect and just as hard to extinguish once discerned. Thus, the risk of fire ignition and passage through interior wall cavities from overheated electric circuits and the like, is not readily apparent to a layman, but is well known to those in the business of electrical fire safety.

Often, as employees and firefighters do not have access to such relatively small spaces in order to view and discern flames, and to extinguish the flames, these fires can spread easily and quickly, even through structures constructed of fire-resistant material. Such a fire can ignite in the cable or wiring itself in a wall or ceiling if it becomes overheated or has been damaged by abrasion, rodents, or by other means where it can be exposed or slightly cut. Such fires can ignite in a junction box of a socket or where multiple conduits connect in a wall, to become a raging inferno and spread quickly from the ignition source by traveling through interior spaces of the ceiling or walls.

Still further, in these modern and uncertain times, fires in wiring between circuit breakers and junction boxes can sadly be ignited by an electromagnetic pulse caused by nuclear detonation of either a conventional or what is known as a "dirty" bomb. Such an electromagnetic pulse occurred in Hawaii decades past when testing by the military detonated over the Pacific Ocean, and could easily occur again in this uncertain world. One such an occasion, the copper conductors of all conventional cable wiring systems can instantly overheat which could/would lead to insulation degradation and fire.

While such potential from overheated circuits of all kinds is dangerous in homes, the risk of harm and loss of life is significantly higher in commercial establishments, high rises, and especially in container ships or cruise ships, since a fire on the open sea in such metal ships spreads quickly and can cause massive loss of life.

Accordingly, the ability to confine an electrically ignited fire to a single room or area, may depend upon the ability to preclude its travel through walls and electrical fixtures, or to accelerate to a larger fire subsequent to ignition. Although previously described conduit systems, and fire-proof and fire-resistant junction boxes are formed of materials meant resist the flames, conventional conduit style electric wiring systems provide no means to extinguish a fire once ignited in the circuit or in wall or ceiling or other space adjacent thereto, or in a junction box where such cables engage other cables or sockets for appliances. While the noted, use of conduit for communication of electrical wiring through buildings and ships and aircraft provides a pathway to contain the wiring, the heat and smoke generated therein easily escapes to the surrounding area and initiates fires.

However, conventional wiring and infrastructure systems provide no concurrent and jointly communicating pathway for the communication and activation of fire suppression and suppression devices and components. Instead, such fire suppression materials must be brought to the source of an electrical fire from a remote position such as a fire extinguisher. Such takes time by the time a wall-hidden or conduit-hidden fire is ongoing but first detected. This time wasted in seeking out a fire suppressant supply and communicating it to the exact location of the previously hidden electrical fire, gives that fire time to spread even further or significantly intensify due to continued electrical heating, where the resulting flames travel through walls and conduits of the structure.

As such there is an unmet need for a cabling system and method configured to route both wiring of electrical circuits in parallel adjacent pathways and through junction boxes and the like, which concurrently allows for positioning of a fire suppression system proximate to any potential fire generated in a conduit or wall or structure. Such a cabling device and method, in addition to providing suppression at or proximate to the point of any hidden or viewable electrical fire, should allow for concurrent positioning for a fire suppression pathway along and adjacent each circuit of electrical wiring. Such a system should also provide site specific fire suppression components positionable in junction and access areas and adjacent electric wires in the conduit system, which will automatically deliver fire suppressant to an overheated circuit. Such a cabling system when employed for fire suppression should also, once activated at a position along the conduit system for electrical wiring, provides a means for cutting electrical power to the individual circuit which has overheated and for signaling and alerting employees and emergency personnel of an overheated circuit or fire caused by one, even where that fire is not yet viewable.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

OBJECTS OF THE INVENTION

It is an object of the present invention to provide a cabling system and method, which includes a concurrent installation of both electric circuits and a fluid conduit adapted for centrally supplied fire suppressant circuits, which are communicable in concert with the electrical wiring pathway from a circuit breaker buss to and through each junction box and housing along the path of each electrical circuit.

It is an additional object of the system herein to provide for suppressant-delivering components engageable with the fluid tubing along a fire suppressant pathway running adjacent or coaxial with the electrical conduit, which will self-activate to communicate fire suppressant to an overheated circuit automatically.

It is an additional object of the cabling system and method herein to provide means to alert the user of a fire or an overheated circuit, even where hidden by walls or conduits, with the concurrent automatic release of fire retardant.

It is yet another object of the present invention to provide a cable having a fluid conduit and wires which is thereby configured for concurrent routing of electrical wires and a fluid pathway for fluid delivery such as a flame retardant material.

It is yet a further object of this invention to provide such a cable system which will also extinguish fires in any electric circuit between junctions as well as sense such a fire suppression and concurrently cut electrical power to that circuit.

These and other objects, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

SUMMARY OF THE INVENTION

In accordance with the purposes of the present invention, as embodied and broadly described herein, the present invention provides a system and method which includes a cabling system enabling the adjacent concurrent routing and proximal positioning, of both electric wires and a fluid conduit or tube. The tube or conduit for fluid flow, can be configured to automatically dispensed fire suppressant, within the conduits, junction boxes, and other components of an electric wiring system for communicating electrical power. The tubing or conduit providing fire suppressant circuits of the cabling system are configured to run along the same pathways through a structure as the wires and electrical junctions of an enclosed electrical system circuit. Employing the cabling and connectable components herein, both the electric wiring and fire suppressant system may be installed concurrently during construction of the structure or vehicle, where the electric system is installed.

The system herein provides an electric cable surrounded by a sheath or cover which also includes a tubing or conduit pathway for communication of fluid or gas along the electric pathway of the cable. The cabling may be thus employed in one mode for delivery of a pressurized fire suppressant supply, which runs within or in combination with and parallel with the electric wiring in an electric conduit pathway for wiring. Some of the further components employable with the cabling system herein for fire suppression, include for example, electrical-box-housed fire suppressant dispensers, which are proximate to the positioning of electric wires joined in a circuit or which communicate in connections to sockets which in turn connect to electricity-consuming devices.

The system includes retardant dispensing components adapted for engagement to the fluid conduit of the cabling, which are configured for operative positioning in engagements with junction boxes, sub-panels, and socket or connection boxes, light fixture mounts, and the like. The dispensing components are configured to engage electric sockets and connectors as well as junctions between wires which enter or exit therefrom. The fluid conduit itself is formed of a material adapted to melt at a temperature indicative of a fire or overload and dispense suppressant at locations in-between the circuit buss and junction boxes.

Connections between fluid conduit or tubing and dispensing components in one preferred mode of the system, employ circular junction points although alternative configurations can optionally include specific terminal male or female connectors for easy disassembly and access. The junction boxes having retardant dispensing components operatively mounted therein, may also include sub panel breakers and busses, and/or sockets engageable with appliances or lighting or other devices consuming eclectic power.

To inhibit the spread of electrical fires, the junction box and other inter-connecting components for connecting and routing of electric circuits, may additionally contain a suppressant dispensing component such as a suppressant chamber, capable of holding a reservoir and releasing a specific volume of fire retardant material into the housing or junction box or the like. The tubing or fluid conduit of the cabling herein, can supply this fire retardant from a central source also, or in some systems charge each such suppressant dispensing component with a local reservoir, and communicate additional suppressant from a central or remote source at a distal end of the fluid conduit.

In the preferred mode of the device, the suppressant chamber when engaged with the fluid conduit, can be composed of a thin housing, which can be ruptured by impact, or which is configured of a thickness and of a material which will melt or open when exposed to a temperature level, indicative or generated by a fire or overheating wiring, prior to a ignition of a fire. The device should be configured for the fluid tubing or conduit of the cabling to engage and accommodate and dispense fire retardants which are either gas or liquid at room temperature such as halon, and to provide a continuous communication of such to a locale until turned off.

Additionally preferred, junction boxes for electrical wires and sockets and the like, may contain two or more suppressant ports, configured to accept the fluid conduit of the cabling to draw retardant material from multiple sources such as nearby junction boxes for increased fire fighting capability.

It is preferred that a dispensing component such as a suppressant chamber or port, include a visible viewable suppressant window, thus allowing for visual confirmation of the presence of a retardant supply therein. The suppressant ports or suppressant chambers can additionally contain one or a combination of fire and retardant activation sensors from a group including heat sensors, microphones, pressure sensors, dyes, color reactive films, accelerometers or contact switches.

One or many flow sensors attached to the fire suppressant buss supplying the suppressant to fluid conduit of the cabling, or embedded within the suppressant ports or at locations on the fluid conduit, can also be used to detect a suppressant chamber rupture or dispensing of retardant, and to send a signal to a central monitoring station, and/or to the circuit breaker supplying the individual electric circuit, to turn off electric power.

The sensor data can either be displayed proximal to individual suppressant component positions of the system, or through an external light or viewing screen, or viewing window. Such data might also routed as an electric or preferably wireless signal to a central panel, for efficient and simultaneous monitoring and diagnosis of all devices running along individual tubing pathways in the system. Remote display panels should contain means to uniquely identify the retardant tubing in relation to the circuit it supplied to each junction box by description or identification number.

In another or second preferred mode of the device, a local supply of the retardant material may be stored within the suppressant chamber and as such, the junction box may dispense retardant which may be supplied or replenished by a conduit connection to the suppressant tubing system.

The cabling herein, in all preferred modes, is configured to include and route one or more electric wires, and at least one adjacent fluid conduit, both of which are surrounded by an outer jacket or sheath. This configuration of both wiring and fluid conduits within an axial passage of a surrounding jacket or sheath, allows for easy concurrent installation of both a suppressant carrying conduit for gas or fluid, and electrical wires, in a manner similar to the conventional installation of wiring cables such as ROMEX or shielded cabling. When the fluid conduit is configured to carry fire suppressant, the fluid conduit may be formed of material adapted to melt or rupture upon reaching a temperature indicative of fire or overheating. Thus, the same cabling provides for communication of fluid or gas flame suppressant supplies to all points on the installed electric cable system, from the circuit breaker to all points along the circuit.

In one preferred mode of the device, where suppressant is supplied from one end, the cabling includes a sheath or flexible jacket surrounding the electric cables and a fluid conduit which may include a series of perforations. These perforations have been shown in experimentation, to allow for trimming during installation. Further, during testing unexpectedly it was found that the perforations or apertures also provided pathways for the dispensing of fire retardant material, to areas surrounding the cabling, should the tubing or fluid conduit carrying the retardant, be exposed to fire or heat within a wall which is of a temperature which will melt it. Additionally, one or a combination of currently available electrical protection devices can also be employed within the junction box for additional protection from a group including surge protectors, dedicated fuses and ground fault intercepts.

When the cabling herein is employed in forming electric circuits, the junction boxes or gang boxes and the like, should be composed of one or a combination of a durable fire resistant, materials such as metal, aluminum, code-allowed plastic, fiberglass, glass or ceramics. The fluid conduit of the cabling should be made of one or a combination of polymeric materials which are non-reactive from a group including polymeric material, plastic, nylon, PVC, polyethylene, or fiberglass or other material which is inert in the presence of the fire suppressant carried within.

Particularly preferred is the employment of High-density polyethylene (HDPE) for the fluid conduit included in the cabling. HDPE has been shown in most indoor installations of the cabling herein, to be superior as fluid conduit to supply retardant. This has been found to be due to HDPE's ability to maintain its structural integrity when exposed to heat below that of fire or potential fire over long periods of time. HDPE has a melting point of substantially 400 degrees Fahrenheit which enhances the ability of the fluid conduit to stay strong and resist melting when adjacent to electric circuits which can naturally heat daily during use.

For example, a common electric wiring insulator material is PVC which melts at a first melting temperature which is substantially at 320 degrees. As such the material for the fluid conduit should preferably stay intact and not rupture or leak, to a second temperature, beyond the first temperature of 320 degrees Fahrenheit, which the wires might reach carrying a high current load. Thus, nylon with a melting point between 400 to 500 degrees Fahrenheit, or High Density polyethylene with a melting point substantially at 400 degrees would be good choices to maintain the fluid conduit intact unless the circuit or area goes beyond a possible operating temperature where a fire or potential fire is present. In all modes of the device herein, the melting temperature of the fluid conduit, or the second melting temperature, should be above a first melting temperature of the insulation on the electric wires.

However, once the temperature threshold is reached due to overheating of the circuit or fire, the fluid conduit will rupture and provide suppressant directly at the source of the fire anywhere along any circuit path Other non metal materials used for the fluid conduit during experimentation, showed signs of softening when exposed to heat over time, at temperatures below that which might be considered dangerous in some instances and thus could cause leaking and fire alarms where none are present. Thus, system reliability in longer term installations, and where electric wiring carries current causing normal but ongoing heating, HDPE or nylon would be more preferable for use in the fluid conduit of the cabling when supplying fire suppressant and used with wiring carrying conventional PVC insulation. However, the material for the fluid conduit can be changed or adjusted such that it will fail and release the fire suppressant at a temperature higher than normal operating circuit temperatures.

The cabling system herein is described for the provision of cabling having both electric wires and a fluid conduit for supplying fire suppressant to allow for the easy installation of a combination wiring system and fire suppressing system during construction or retrofit of a building or structure. The cabling of the system herein would be especially useful to protect cruise ships, hospitals, nursing homes, airplanes, submarines, underground bunkers, as well as the noted use in buildings, businesses, restaurants, and residences, or in any situation where one skilled in the art would consider the ability to automatically sense potential or actual electrical fires and extinguish them.

However, using the uniquely configured cable herein having both a fluid conduit and electrical wires in the same installed cabling component, the cabling can also be employed for other uses where electrical wires along with a fluid conduit would be beneficial. Such could include, but should not be limited to, outside power distribution circuiting, either over roof tops, or in desert (solar farm) style applications, for production plants, in areas of weather having high heat for carrying electricity, and other installations. In these modes, instead of fire retardant or suppressant being charged and delivered by the fluid conduit of the cabling, fluid conduit can be charged with a non conductive coolant, glycol for example, which when flowing though the system can help with heat dissipation.

Additionally, the cabling herein would be helpful in very hot environments, where an engineer must de-rate (increase the size) of the conductors employed for carrying electric current to account for over heating due to ambient temperatures. Using the cabling herein with the unique combination fluid conduit and electrical wiring running adjacent, the user can employ the fluid conduit to flow the fluid to cool the circuits. This could eliminate the expensive de-rating of wiring due to outside or environmental ambient impacts.

Still further in another mode, content components such as lamps could have small canisters of fire retardant mounted within the assembly and trance the power circuit using the fluid gas line from strain relief up to light socket in combination with a simple locking switch, to either directly short the conductor to cause breaker to trip or open should the canister release.

As such before explaining at least one preferred embodiment of the herein disclosed invention in detail, it is to be understood that the cabling invention is not limited in its application to the details of construction and to the arrangement of the components in the following description or illustrated in the drawings which primarily are directed to the use of the combination fluid and electrical conduit in buildings, structures and vehicle for fire suppression. The cabling system herein described and disclosed in the various modes and combinations is also capable of other embodiments and of being practiced and carried out in various ways which will be obvious to those skilled in the art. Any such alternative configuration as would occur to those skilled in the art is considered within the scope of this patent. Also, it is to be understood that the phraseology and terminology employed herein are for the purpose of description and should not be regarded as limiting.

As can be discerned, those skilled in the art will appreciate that the conception upon which this disclosure is based may readily be utilized as a basis for designing of other systems of cabling with concurrent and adjacent positioning of electrical circuits and at least one fluid carrying conduit. It is important, therefore, that the claims be regarded as including such equivalent construction and methodology insofar as they do not depart from the spirit and scope of the present invention.

BRIEF DESCRIPTION OF DRAWING FIGURES

The accompanying drawings, which are incorporated herein and form a part of the specification, illustrate some, but not the only nor exclusive examples of embodiments and/or features of the disclosed system. It is intended that the embodiments and figures disclosed herein are to be considered illustrative of the invention herein, rather than limiting in any fashion. In the drawings.

FIG. 3 displays a perspective view of one preferred mode of the cabling of the system herein which is formed with wires for electric communication in parallel adjacent positioning with at least one fluid conduit configured for fluid or gas flow therethrough, such as a fire suppressant fluid.

FIG. 4 shows an electric junction box configured for engagement with the cabling herein, showing in exploded view, a suppressant chamber engaged as a cover.

FIG. 4a depicts the junction box of FIG. 4, assembled.

Figure 5:
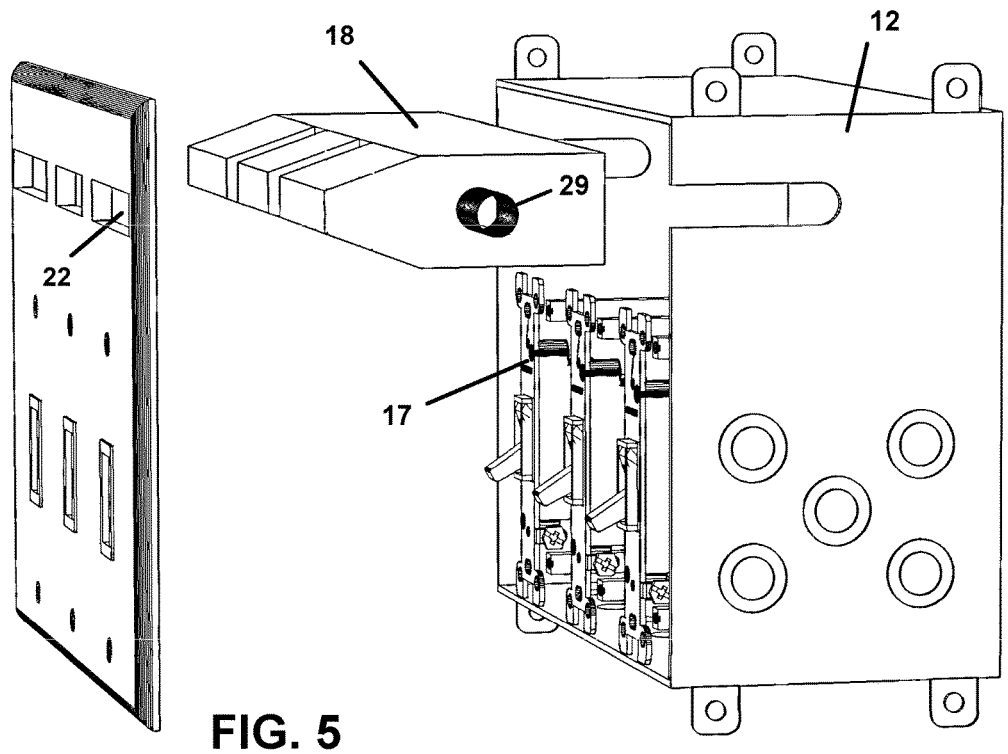

FIG. 5 depicts a gang box configured for positioning of electric switches, having a suppressant chamber with opposing openings, adapted for engagement with the electric wires and fluid conduit of the cabling herein.

Figure 6:
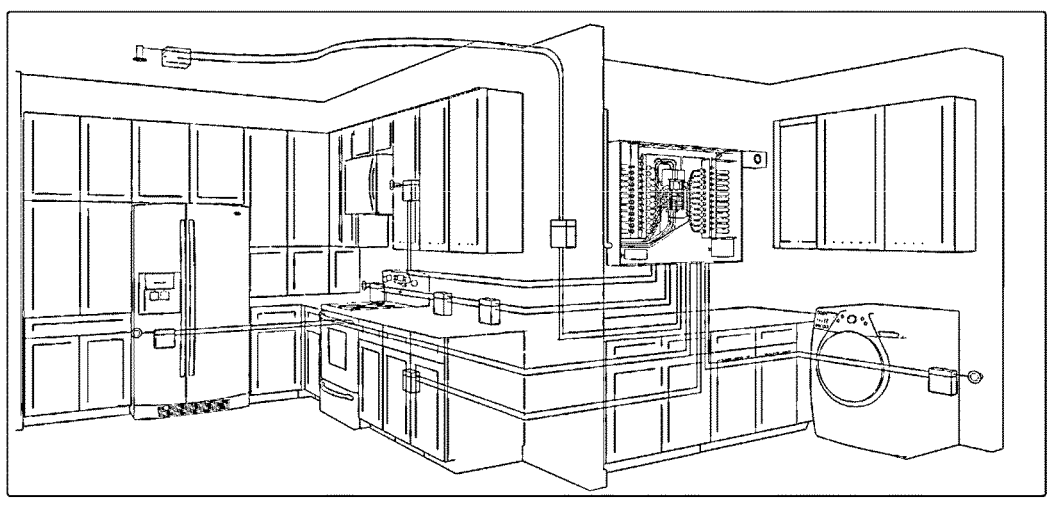

FIG. 6 shows an example of the cabling herein employed as a fire suppressant system having both electrical circuits and fluid conduits carrying fire suppressant, running from a central position or switch room.

Figure 7:
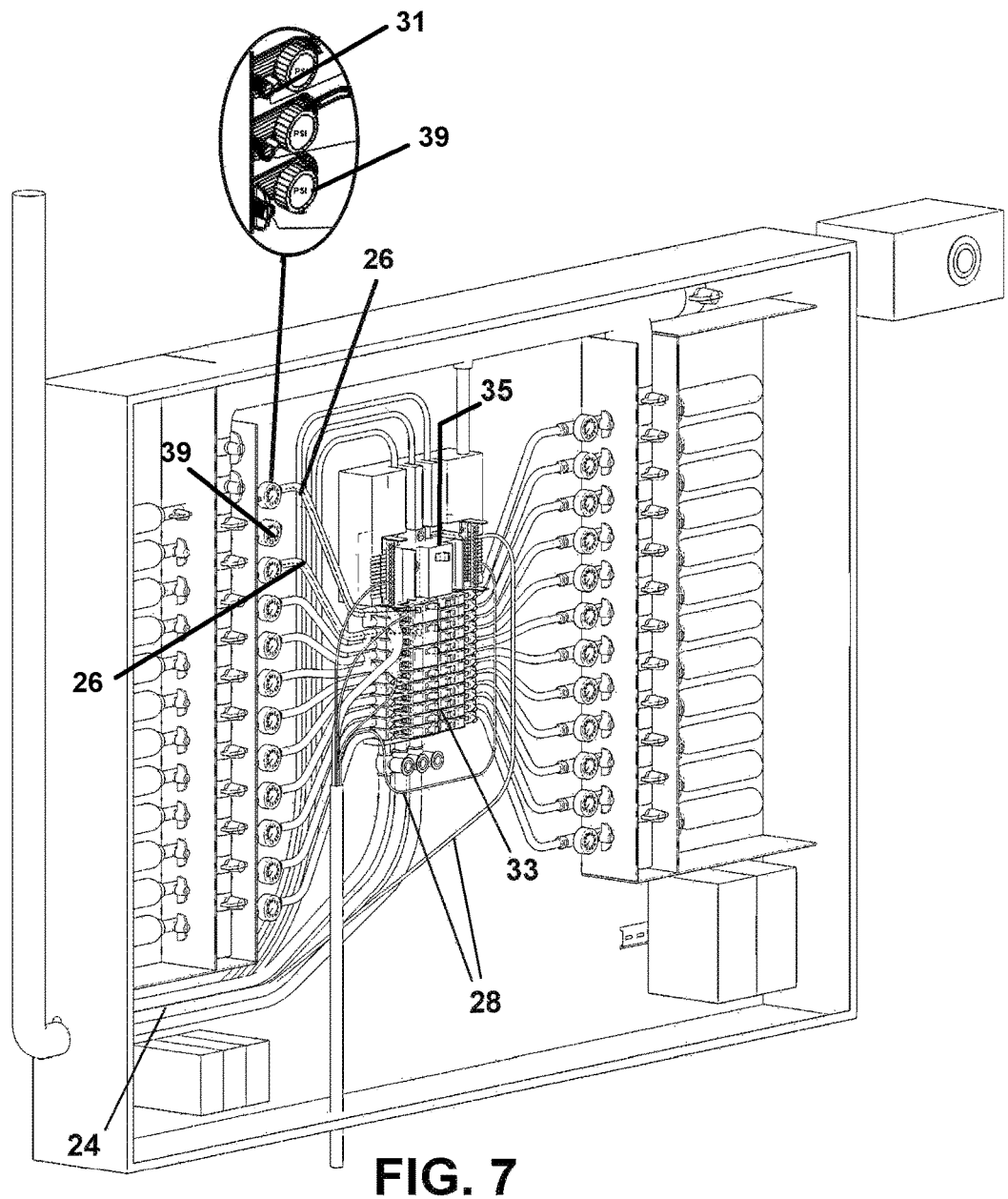

FIG. 7 depicts a mode of employment of the cabling herein in a fire suppressant system, showing the electrical buss for electric circuit breakers and the retardant supply buss positioned to route retardant through the fluid conduit of the cabling, where both the fluid conduit and electric wires run in the cabling in a substantially parallel communication to different electric circuits.

Figure 8:
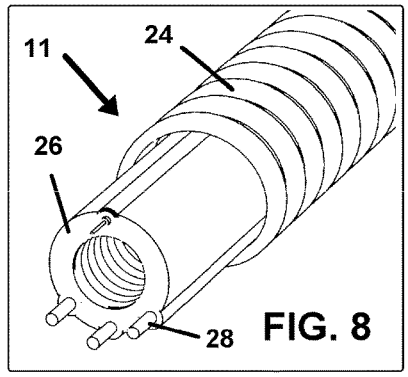

FIG. 8 shows the cabling herein having a fluid conduit with wiring positioned in the sidewall forming the fluid conduit and a surrounding flexible sheath.

Figure 9:
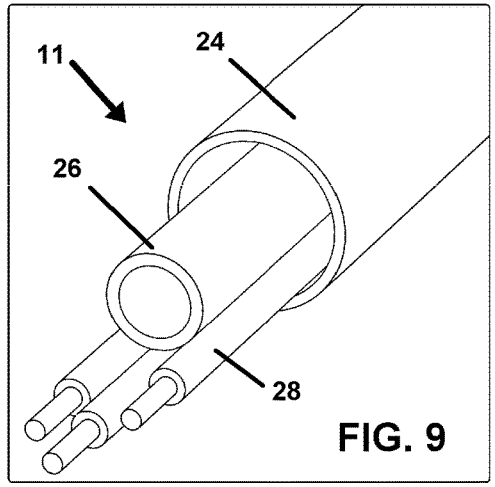

FIG. 9 shows the cabling herein formed with a fluid conduit and wiring running through the axial passage of the surround flexible sheath.

Figure 10:
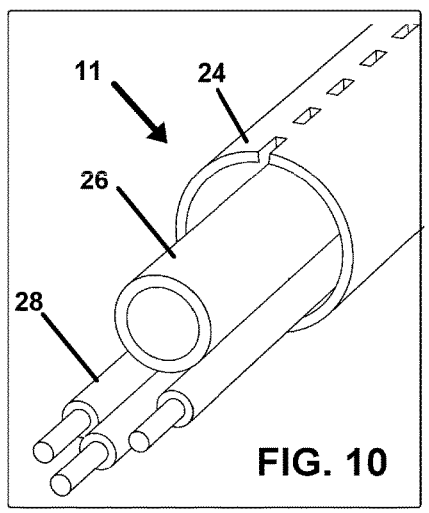

FIG. 10 depicts the cabling herein in another mode with a plurality of electric wires and at least one fluid conduit running axially through the surrounding sheath which has perforations or sequential aligned apertures formed therein.

Figure 11:
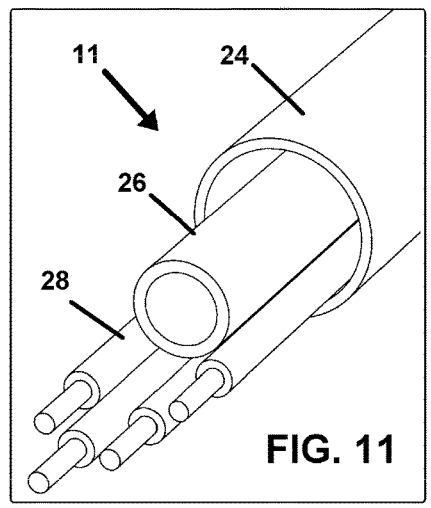

FIG. 11 shows the cabling of the system herein wherein the plurality of wires carried in the sheath axial passage is four, and a single fluid conduit runs parallel thereto.

Figure 12:
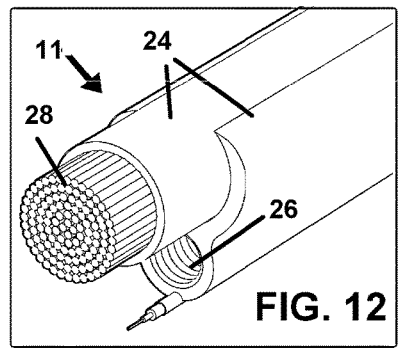

FIG. 12 depicts a mode of the device wherein electric wires are positioned within the material forming the fluid conduit in a unitary structure of cables and fluid conduit.

Figure 13:
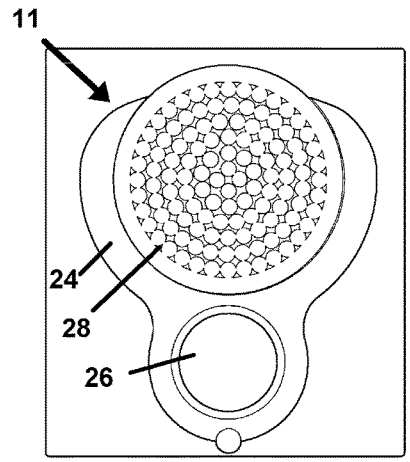

FIG. 13 is an end view of the mode of cabling of FIG. 12.

Figure 14:
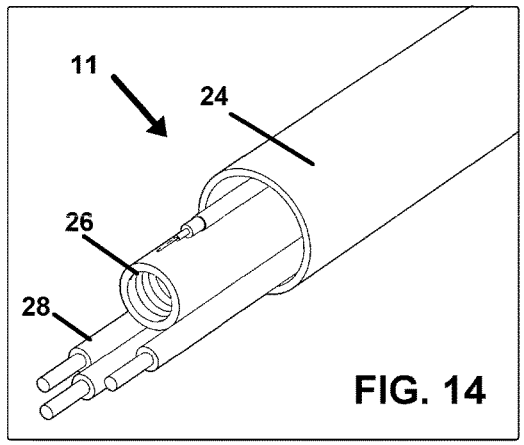

FIG. 14 shows that the cabling can carry both a plurality of electric wires as well as one or more communications cables which run within the axial passage of the surrounding sheath along with the fluid conduit.

Figure 15:
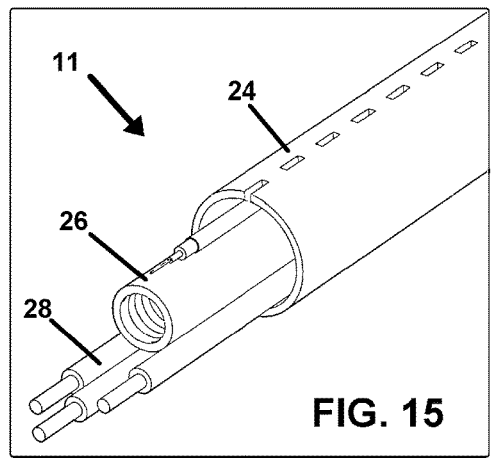

FIG. 15 depicts the cabling of FIG. 14 showing perforations or sequentially aligned apertures formed in the sheath providing the axial passage for the fluid conduit and wires.

Figure 16:
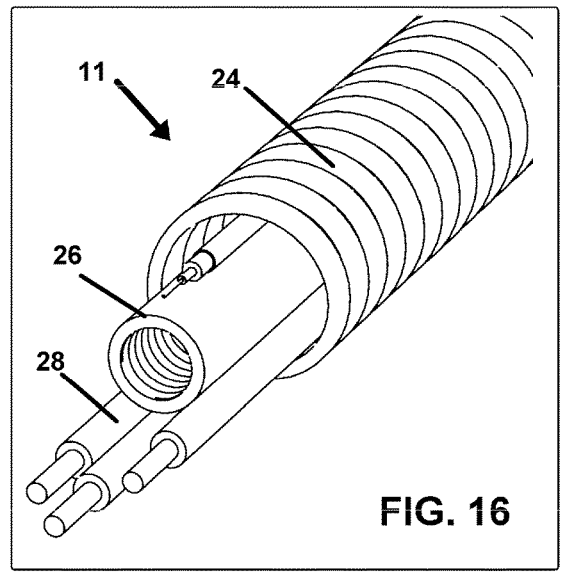

FIG. 16 shows a mode of the cabling herein having an flexible but armored sheath surrounding the axial passage carrying at least one fluid conduit and one or the shown plurality of wires for electric current.

Figure 17:
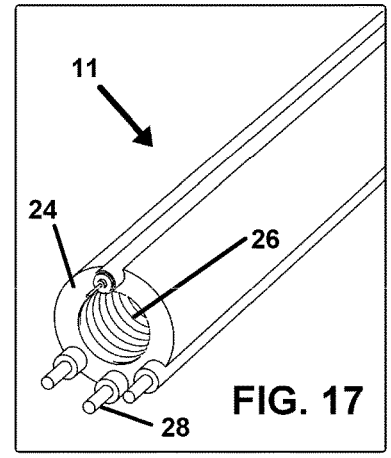

FIG. 17 depicts the cabling herein, wherein the electric wires are carried in the sidewall forming the fluid conduit herein, where the wires may be extruded with the fluid conduit, or pressed into channels formed in the exterior of the fluid conduit.

Figure 18:
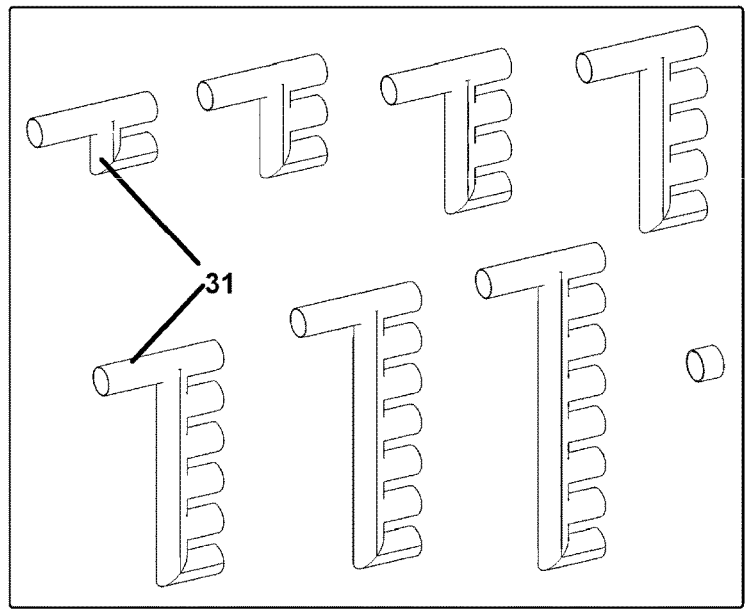

FIG. 18 shows differing connectors for engaging the fluid conduit of different cables for fluid flow therebetween.

Figure 19:
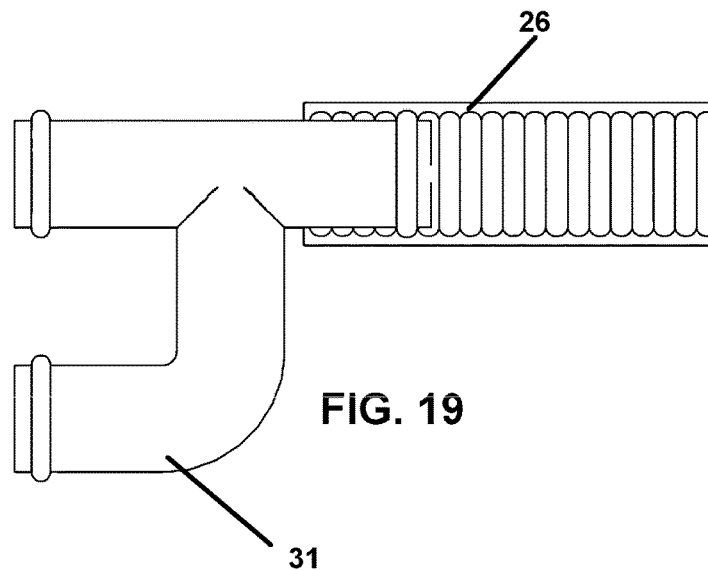

FIG. 19 depicts a sliced view showing an interior passage of a fluid conduit in a sealed engagement with a fluid connector such as in FIG. 18.

Figure 20:
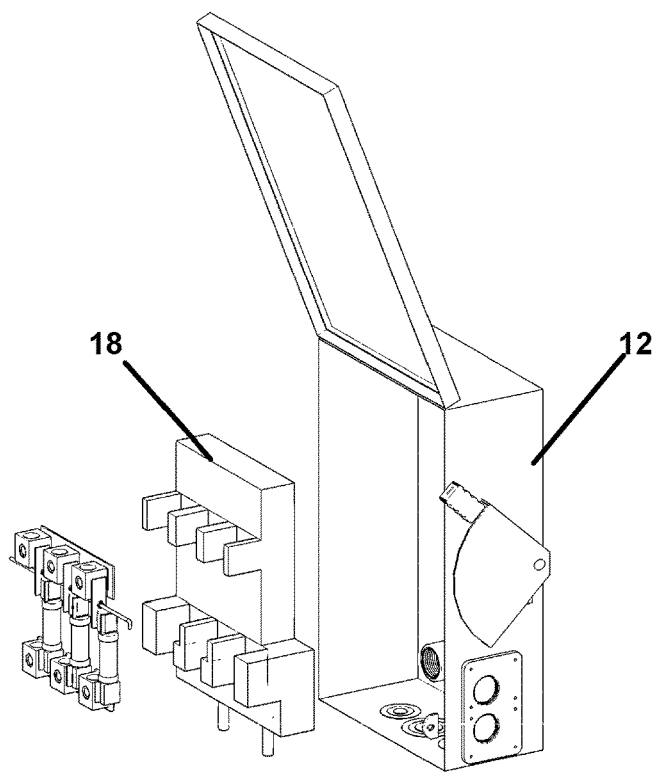

FIG. 20 shows exemplars of a sub panel, in exploded view, which is adapted for engagement with both the wires, and the fluid conduit of the cabling herein, to provide electric power to the buss and fire suppressant to the fluid dispenser.

Figure 21:
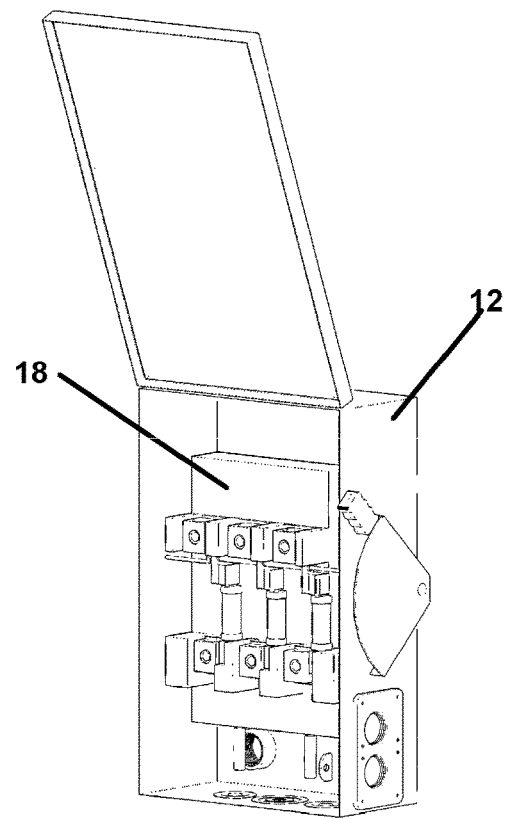

FIG. 21 shows the sub panel of FIG. 20 assembled and ready for engagement with both the wires and fluid conduit of the cabling herein.

Figure 22:
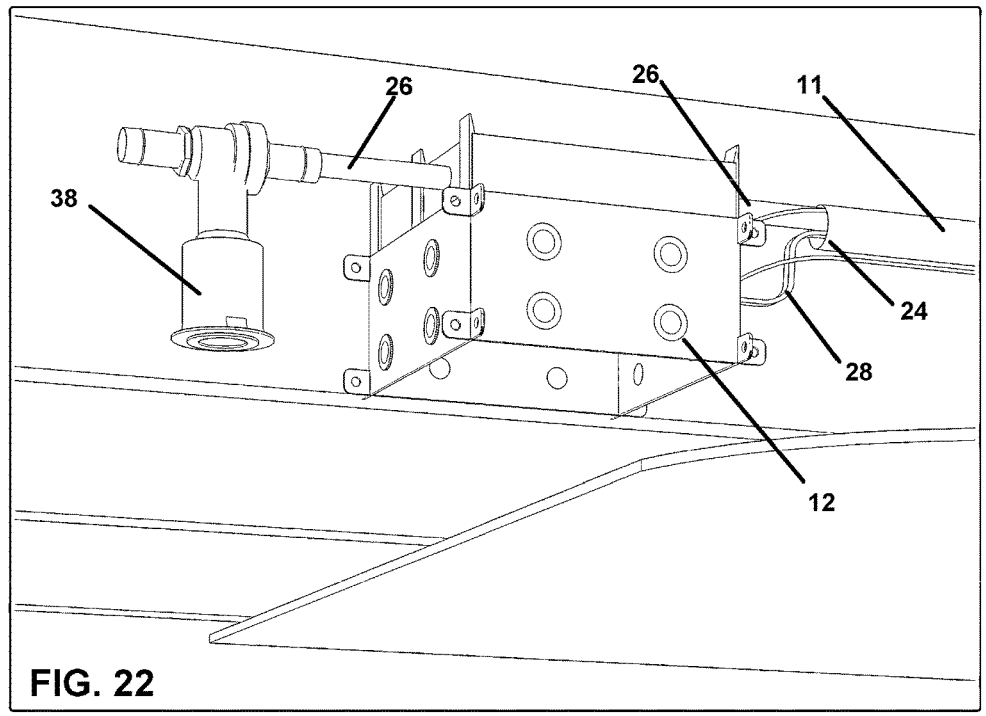

FIG. 22 shows the cabling herein with the wires and fluid conduit of the cabling in operative engagement with a junction box, and fluid dispenser showing a fluid dispensing sprayer engageable with the fluid dispenser.

Figure 23:
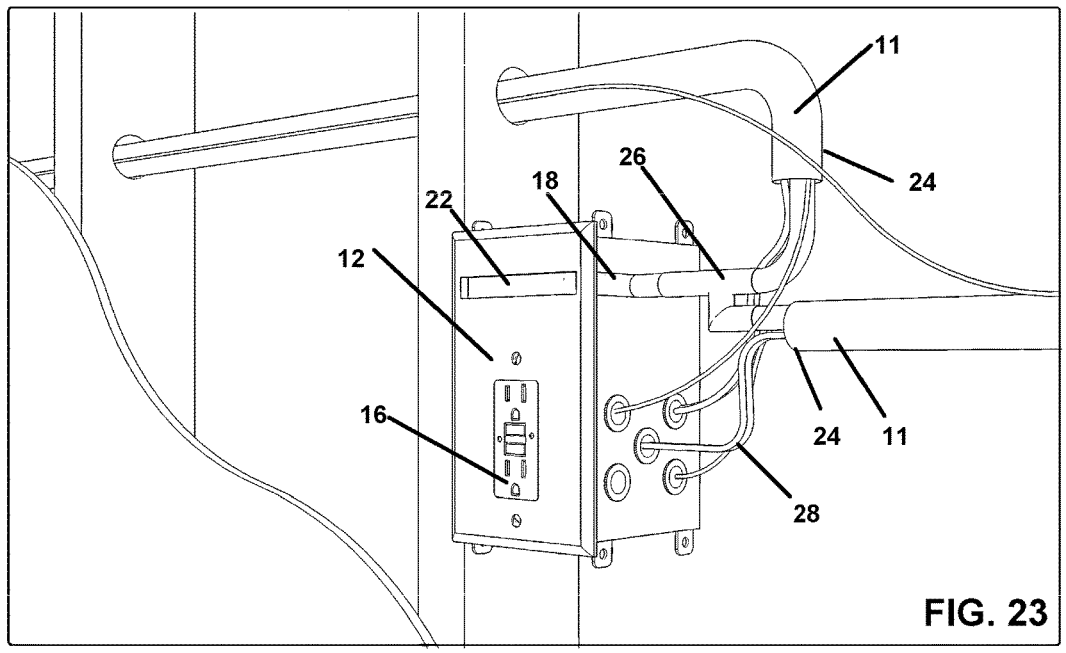

FIG. 23 shows the cabling of the system herein, connected in a circuit for both the fluid conduit and wiring.

Figure 24:
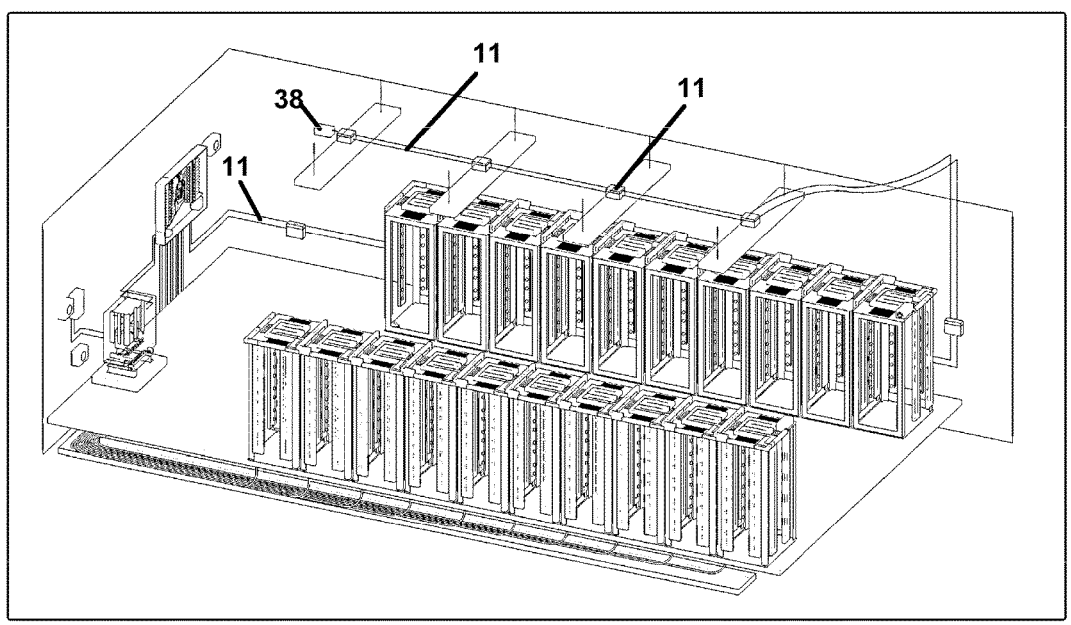

FIG. 24 shows the cabling of the system herein providing both wiring and a fluid conduit operatively engaged to provide fire suppressive material for both socket connectors as well as overhead dispensers of fire suppressant, such as in a server room.

DETAILED DESCRIPTION OF THE INVENTION

Figure 1:
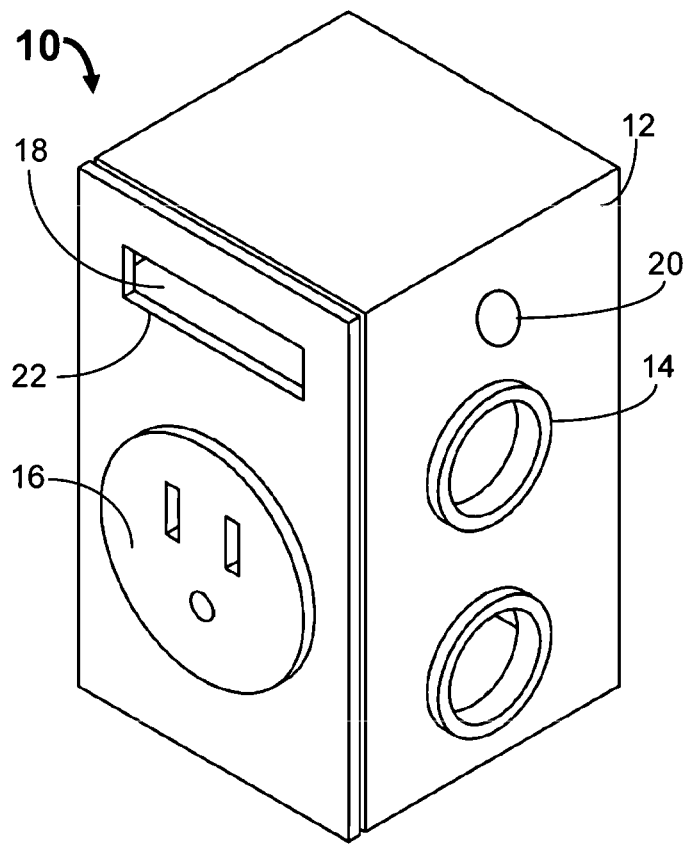
FIG. 1 depicts a perspective view of a junction box employable with the cabling herein, depicted for example in FIGS. 8-17.

Now referring to the drawings in FIGS. 1-24, wherein similar components are identified by like reference numerals, there is seen in FIG. 1, and all interconnective components are configured for operative engagement with the cabling 11 herein such as in FIGS. 8-17, to provide one or a plurality of wires and at least one fluid conduit, in the same cable 11 surrounded by a sheath 24 or cover. As noted, the cable 11 herein is employable with other systems where the parallel and concurrent positioning of both a fluid conduit 26 and electric wires 28 along the entire path of the same cable 11 would be beneficial.

As shown in FIG. 1, when the cable 11, such as in FIG. 3 or FIGS. 8-17 herein, is employed to provide a combination electric wiring system and fluid passage for a fire suppressant system, the cable 11 is operatively engageable with other components in the system such as a junction box 12 or gang box component which is meant as any electrical box or the like used to join wires, engage sockets, lighting, sub circuits or for other purposes for such electrical boxes. The junction box 12 may be configured to house both electric connections therein such as to or between other wires 28, and/or an electric socket 16, and/or a fire suppressant component or chamber 18, or other fire suppression fluid or gas emitter.

Figure 2:
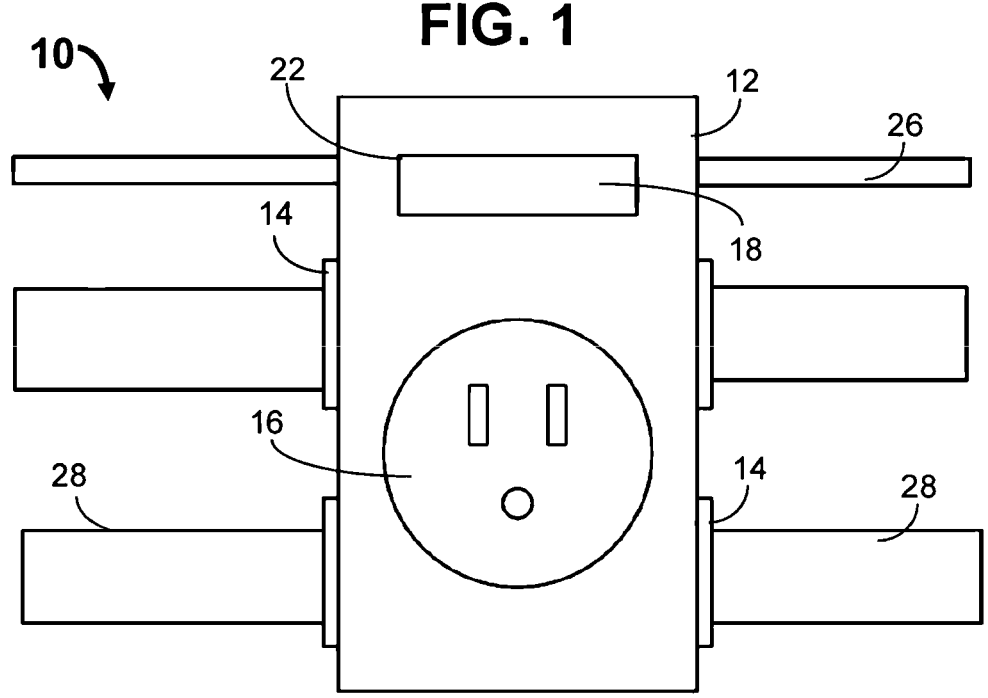
FIG. 2 shows a front view of the junction box of FIG. 1 engaged in operative engagement with the cabling herein carrying both electric wires and one or more fluid conduit lines carrying fire suppressant.

The cable 11, when employed in a fire suppressing electrical system 10, is deployable in a variety of configurations, such as with one or more gang boxes or junction boxes 12, shown in FIGS. 1 and 2 and 5, for example. Such a junction box 12, surrounds and secures the electrical connections between two or more of the wires 28 which enter or exit through one or more apertures defining openings 14.

Such junction boxes 12 are known by other names and surround confections mid circuit and are also used for sockets, light fixtures, and a wide variety of connections. However, this description should not be limiting as junction box 12 should be considered to be any housing where cables are joined, divided, connected to an electric device, or for other purposes. Although the openings 14 shown herein in the system 10 consist of circular apertures formed in the junction box 12, alternative constructions can optionally include specific male or female connectors for easy disassembly and access.

As an example, the junction boxes 12 may be configured to engage with conventional sockets 16, or switches 17, of electric fixtures, and/or wire 28 connections with wire nuts and other conventionally employed electrical components and junctions to configure the system for engagement of components to the electrical power within.

To inhibit the spread of electrical fires, in the system herein, junctions between conduits and wiring in the electrical system such as at any type of junction box 12, may also include an suppressant chamber 18. The suppressant chamber 18 is configured to receive and hold a supply of fire suppressant or retardant such as Halon gas from the fluid conduit 26 which communicates with a central supply under pressure. The suppressant chamber 18 holds such fire suppressant or retardant within an internal cavity defined by the walls forming the suppressant chamber 18. The suppressant chambers 18 may be configured to hold a local supply of retardant therein, should the fluid conduit 26 supplying the system fail, thus maintaining a local sealed supply of retardant or suppressant in each chamber 18 if the fluid conduit 26 is compromised. This can be done using valves on the inlet 29 and an outlet 29 of the suppressant chamber 18. Or the suppressant chamber 18 may be provided a fluid supply from the fluid conduit 26 which is communicated from a reservoir of suppressant.

The system 10 is configured such that any damage to the junction box 12 or its contents, through excess heat or fire, such as caused by electrical short or over-heated wiring 28, will melt and cause a rupture of the suppressant chamber 18. Upon the formation of a heat induced rupture, the retardant or suppressant within or supplied to the suppressant chamber 18 is communicated to the fire or overheating area. The fluid conduit 26, can supply each suppressant chamber 18 and junction box 12, with a continuous pressurized supply of retardant or fire suppressant which will continue to extinguish or prevent a fire from getting larger. As noted, the fluid conduit 16 itself can be formed of material adapted to melt and rupture at a threshold temperature and communicate the fire suppressant to adjacent areas anywhere the cable may be located in a wiring system, such as in-between junction boxes 12 and fixtures and a circuit breaker buss.

In one preferred mode of the system 10, the suppressant chamber 18 can be composed material, such as HDPE, with a wall thickness which is calculated to melt and or otherwise open when exposed to a temperature over a determined safe level or when exposed to fire. This will cause a continuous dispensing of fire retardant or suppressant to extinguish the fire or prevent one by preventing oxygen from reaching the heat source.

Shown in FIGS. 2 and 4 and 5, the junction box 12 is adapted to operatively engage with the fluid conduit 26 either through a conduit opening 20, or by communication of the entire cable 11 through an opening 14. Each suppressant chamber 18 is configured for a sealed engagement with the fluid conduit 26 running through the cable 11 herein, to provide the suppressant chamber 18 with a fluid or gas suppressant supply.

For such engagement for example, the suppressant chamber 18 can be configured with one or a plurality of flanges 19 with axial passages into the interior cavity of the suppressant chamber 18, which act as inputs or outputs for fluid to continue the communication of the suppressant through the chamber 18 to subsequent chambers 18 along a fluid circuit with connections therebetween by the fluid conduit 26 running through the axial passage 23 of the sheath 24 of the cable 11 along with the wires 28.

Preferably, the junction box 12 should include a suppressant window 22 for visual inspection to confirm a local supply of retardant or suppressant is present within the suppressant chamber 18 which is viewable through the window 22.

One or a plurality of flow and/or pressure sensors 31 may be placed in communication with suppressant axial passage 25 running through the fluid conduit 26 such as in FIG. 7. For example, sensors 31 such as pressure supply meters, flow sensors, or pressure sensors, shown in FIG. 7 and/or other electronic sensors which may discern a pressure drop in a fluid conduit 26 circuit, can be operatively engaged with each fluid circuit which parallels an electric circuit running through a cable 11.

The sensor data can either be displayed proximal to the system 10, through an external light or screen, or routed to a central safety video display panel, for efficient and simultaneous monitoring and diagnosis of all systems 10, or in a particularly preferred mode, such as shown in FIG. 7 for example, a signal from the sensors 31 will be communicated in a wired or wireless fashion to a circuit breaker 33 powering the same wire or wires 28 running through a cable 11 with a fluid conduit 26. The signal will cause the circuit breaker 33 to open, and switch off electric power to the wires 28 in the cable 11 of the circuit where suppressant is being dispensed and which has caused the sensor 31 to generate a signal. Remote display panels if displaying a sensor signal generation, should contain means to uniquely identify the location and circuit of the sensor 31 generating it.

Depicted in FIG. 3 is one example of the cable 11 herein, showing the sheath 24 forming an axial passageway 23 which provides a pathway for one or more wires 28, and at least one adjacent running fluid conduits 26, as shown, although a plurality of fluid conduits 26 can be included in a cable 11.

Formation of the cable 11 with wires 28 and a fluid conduit 26 running in an axial passageway 23 defined by the surrounding sheath 24, allows for easy instillation of the cable 11 in a fashion much like conventional conduit routed electrical systems, thereby allowing concurrent positioning of both wires 28 and a fluid conduit 26 throughout the system.

As shown in FIGS. 3, 10, and 15, the sheath 24 may include an array of aligned apertures 32 which allow for easier trimming during installation. Further, these apertures 32 provide vents to communicate fire suppressant from the fluid conduit 26 if a fire or heat melts the fluid conduit 26 to a rupture in between junction boxes 12. The fluid conduit 26, as noted, should be made of any non-reactive, durable material such as polymeric material, nylon, PVC or fiberglass, or most preferably HDPE, which has a melting point which will cause a rupture the fluid conduit 26 at an appropriate temperature above the operating temperature of the wires 28, to extinguish or retard a fire if needed. The sheath 24 would also preferably be formed of a similar material to that of the fluid conduit 26, such that it will not melt or rupture in areas where the fluid conduit 26 is also adapted to operate which may be hot.

Shown in FIGS. 4 and 4a is a mode of the junction box 12 which is depicted with the suppressant chamber 18, configured to engage and provide a removable cover for the internal cavity of box 12. Such would work well at junctions between main and sub circuits of the electrical system.

In FIG. 5 there is shown a gang box or junction box 12 configured for engagement of electric switches 17. This mode of the junction box 12 is engaged with a suppressant chamber 18 with connections 29 on both ends, for the fluid conduit 26 for a throughput of suppressant supplied by the fluid conduit 26 through the chamber 18 and on to a subsequent chamber 18. Windows 22 in the faceplate allow for viewing of the contents of the suppressant chamber 18.

In FIG. 6 there is depicted an example of the system 10 herein using the cable 11 for positioning of both electrical circuits of the wire 28 and fire suppressant circuits of the fluid conduits 26 running to remote positions from a main electrical connection buss and retardant supply buss.

Shown in FIG. 7, as noted above, shows the system where various circuits of the fluid conduit 26 of each cable 11 connect to a pressurized suppressant supply in a fluid buss. The wires 28 from each respective cable 11 connect to one of the breakers 33 of an electric buss 35. Gauges 39 and/or sensors 31 are engaged to suppressant circuits of each fluid conduit 26 and will sense the current pressurization level in each such circuit formed by a fluid conduit 28 in a cable 11. The fluid conduit 26 and wires 28 of each cable 11 are routed through the axial passageway 23 of the sheath 24 with the wires 28 therein, thereby providing parallel and concurrent communication of electrical power and fluid such as fire suppression along the entire route of each individual circuit of the electrical system.

As noted, FIG. 8 shows the cable 11 herein having a fluid conduit 26 and a plurality of wires 28, both positioned in axial passage 23 of a surrounding flexible sheath 24 holding the components of the cable 11 adjacent. In the mode of FIG. 8, the material forming the sidewall of the fluid conduit 26, is engaged with the plurality of wires 28 during extrusion of the fluid conduit 26. Thus, the fluid conduit 26 and plurality of wires 28 running through the material forming it, are a unitary structure of wires 28 and fluid conduit 26.

In FIG. 9 is shown the cable 11 or cabling herein configured with a fluid conduit 26 and wires 28 running through the axial passage 23 of the surround flexible sheath 24. The cable 11 so formed, can be wound into rolls or spools which can be unwound and installed in a conventional fashion thereby encouraging widespread use.

FIG. 10 depicts the cable 11 herein in another mode with a plurality of three electric wires 28 and at least one fluid conduit 26 running axially through the surrounding sheath 24. The wall of the sheath 24 includes aligned and sequentially positioned apertures 32 which as noted allow for easier cutting of the cable 11 as well as provide vents for passage of fire suppressant from the interior of the sheath 24.

FIG. 11 shows the cable 11 of the system herein wherein the plurality of wires carried in the sheath 24 axial passage is four, and a single fluid conduit 26 runs parallel thereto.

FIGS. 12 and 13 show a mode of the cable 11 wherein electric wires 28 are positioned during extrusion within the material forming the fluid conduit 26, and form the fluid conduit 26 and wires 28 in a unitary structure.

FIG. 14 shows that the cable 11 or cabling with a plurality of electric wires 28 as well as one or more communications cables 28a which run within the axial passage of the surrounding sheath 24 along with the fluid conduit 26. As with all other modes of the formed cable 11, it can be wound on large reels and dispensed during installation.

FIG. 15 shows the cable 11 of FIG. 14 having the sequentially positioned apertures 32 formed in the sheath 24 providing the axial passage for the fluid conduit 26 and wires 28.

In FIG. 16 is shown the cable 11 or cabling herein having an armored sheath 24 surrounding the axial passage carrying at least one fluid conduit 26 and one or the shown plurality of wires 28 for electric current.

FIG. 17 depicts the cable 11 or cabling herein, wherein the electric wires 28 are carried in the sidewall forming the fluid conduit 26 herein. As shown, the wires 28 may be pressed into channels formed in the exterior of the sheath 24 surrounding the fluid conduit 26.

FIG. 18 shows differing connectors 31 for sealed engagement between ends of the fluid conduits 26, allowing a number thereof to be fluidly engaged.

In FIG. 19 is depicted a sliced view showing an interior passage of a fluid conduit 26 in a sealed engagement with a fluid connector 31 such as any of those in FIG. 18.

In FIGS. 20-21 are depicted exemplars of a sub panel junction box 12 of an electric system, which is adapted for engagement with both the wires 28, and the fluid conduit 26 of the cable 11 herein, to provide electric power to the buss and fire suppressant to the fluid dispenser. The suppressant chamber 18 in the mode shown, has multiple inlet and outlet flanges 19 to allow the flow of suppressant to flow into and through the chamber 18 downline to the rest of the circuit.

FIG. 22 shows the cable 11 herein with the contained wires 28 and fluid conduit 26 of the cable 11, in operative engagement with a junction box 12, and fluid dispenser 18 engaged with a fluid dispensing sprayer 38 adapted to direct a downward flow of suppressant when activated by heat above a predetermined level. Such would be employed for example on a ceiling of a room to be protected.

Shown in FIG. 23 is a depiction of the cable 11 herein, installed in a structure and providing both wiring 28 and a fluid conduit 26 which may be operatively engaged with a junction box 12 hosting a socket 16, to provide fire suppressive material through the fluid conduit 26 to the depicted junction box 12 and a subsequent junction box 12 or other point serviced by the cable 11 extending therefrom. An example of an installation of the system is shown in FIG. 24 where the cable 11 provides the path for fire suppressive material for both socket connectors as well as overhead dispensers or sprayers 38 of fire suppressant, such as in a server room.

As noted, any of the different configurations and components can be employed with any other configuration or component shown and described herein. Additionally, while the present invention has been described herein with reference to particular embodiments thereof and steps in the method of production, a latitude of modifications, various changes and substitutions are intended in the foregoing disclosures, it will be appreciated that in some instance some features, or configurations, or steps in formation of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. A cable system comprising:
a cable, said cable having a sheath with an axial pathway running a length of said cable between a first end of said cable and a second end of said cable;
said cable having one or a plurality of electrically conductive wires running through said axial pathway of said sheath for said length of said cable;
said cable having a fluid conduit engaged with or within said sheath and running said length of said cable, said fluid conduit having a sidewall surrounding an axial passage thereof;
wherein said length of said cable is engageable to communicate electricity through said conductive wires between said first end and said second end of said cable and to concurrently communicate a fire suppressant within said fluid conduit, between said first end of said cable and said second end of said cable;
said electrically conductive wires and said fluid conduit at one end of said cable, engageable with a junction box;
a suppressant chamber configured for attachment with said junction box;
said suppressant chamber having a connection for sealed engagement of said axial passage of said fluid conduit, with an internal cavity of said suppressant chamber;
said internal cavity forming a reservoir of a fire suppressant communicated through said axial passage of said fluid conduit from a fire suppressant supply;
said electrically conductive wires having an insulation coating circumferentially engaged thereon, said insulation having a first melting temperature; and
said suppressant chamber being formed of material having a second melting temperature, said first melting temperature exceeding said second melting temperature, whereby said suppressant chamber melts and causes an emission of said fire suppressant from within said internal cavity, only when a temperature of said conductive wires within said junction box or an interior of said junction box, exceeds said second melting temperature.

2. The cable system of claim 1, additionally comprising:
said cable engaged in an electric circuit for carrying electricity over said electrically conductive wires;
said electrically conductive wires at said first end of said cable, engaged with a circuit breaker communicating said electricity to said electrically conductive wires;
said axial passage of said fluid conduit at said first end of said cable, in a sealed connection with a pressurized supply of fire suppressant;
a pressure sensor connected with said axial passage, said pressure sensor sensing a fire suppressant pressure of said pressurized supply of fire suppressant, within said axial passage;
said pressure sensor configured to communicate a signal to said circuit breaker upon sensing a drop in said fire suppressant pressure; and
said signal causing said circuit breaker to cease communicating said electricity to said electric circuit, whereby an emitting of said fire suppressant anywhere along said circuit will cause a disconnection of electricity from said electric circuit.

3. The cable system of claim 2, additionally comprising:
said internal cavity viewable through a viewing window; and
confirmation of a presence of said pressurized reservoir of a fire suppressant within said internal cavity being discernable through said viewing window.

4. The cable system of claim 3, additionally comprising:
apertures running sequentially along said sheath from said first end of said cable to said second end of said cable;
said apertures defining passages between said axial pathway of said sheath and areas surrounding an exterior of said sheath; and
said fire suppressant emitted from said fluid conduit within said sheath communicable to said areas surrounding said exterior of said sheath, through said passages.

5. The cable system of claim 2, wherein said circuit breaker engaged with said electrically conductive wires at said first end of said cable is one of a plurality of circuit breakers connected with an electric buss of a circuit breaker panel; and
said sealed connection with a pressurized supply of fire suppressant at said first end of said cable is located within said breaker panel housing said electric buss.

6. The cable system of claim 1, additionally comprising:
said internal cavity viewable through a viewing window; and
confirmation of a presence of said pressurized reservoir of a fire suppressant within said internal cavity being discernable through said viewing window.

7. The cable system of claim 1, additionally comprising:
apertures running sequentially along said sheath from said first end of said cable to said second end of said cable;
said apertures defining passages between said axial pathway of said sheath and areas surrounding an exterior of said sheath; and
said fire suppressant emitted from said fluid conduit within said sheath communicable to said areas surrounding said exterior of said sheath, through said passages.

8. A cable system comprising:
a cable, said cable having a sheath with an axial pathway running a length of said cable between a first end of said cable and a second end of said cable;
said cable having one or a plurality of electrically conductive wires running through said axial pathway of said sheath for said length of said cable;
said cable having a fluid conduit engaged with or within said sheath and running said length of said cable, said fluid conduit having a sidewall surrounding an axial passage thereof;
wherein said length of said cable is engageable to communicate electricity through said conductive wires between said first end and said second end of said cable and to concurrently communicate a fire suppressant within said fluid conduit, between said first end of said cable and said second end of said cable;
said electrically conductive wires having an insulation coating circumferentially engaged thereon, said insulation having a first melting temperature; and
said sidewall of said fluid conduit being formed of material having a second melting temperature, said first melting temperature exceeding said second melting temperature, whereby said sidewall of said fluid conduit only melts at a location along said length of said cable where a temperature of said conductive wires at said location, exceeds said second melting temperature;

said electrically conductive wires and said fluid conduit at one end of said cable, engageable with a junction box;

a suppressant chamber configured for attachment with said junction box;

said suppressant chamber having a connection for sealed engagement of said axial passage of said fluid conduit, with an internal cavity of said suppressant chamber;

said internal cavity forming a reservoir of a fire suppressant communicated through said axial passage of said fluid conduit from a fire suppressant supply;

said electrically conductive wires having an insulation coating circumferentially engaged thereon, said insulation having a first melting temperature; and said suppressant chamber being formed of material having a second melting temperature, said first melting temperature exceeding said second melting temperature, whereby said suppressant chamber melts and causes an emission of said fire suppressant from within said internal cavity, only when a temperature of said conductive wires within said junction box, or an interior of said junction box, exceeds said second melting temperature.

9. The cable system of claim 8, additionally comprising:
said cable engaged in an electric circuit for carrying electricity over said electrically conductive wires;

said electrically conductive wires at said first end of said cable, engaged with a circuit breaker communicating said electricity to said electrically conductive wires;

said axial passage of said fluid conduit at said first end of said cable, in a sealed connection with a pressurized supply of fire suppressant;

a pressure sensor connected with said axial passage, said pressure sensor sensing a fire suppressant pressure of said pressurized supply of fire suppressant, within said axial passage;

said pressure sensor configured to communicate a signal to said circuit breaker upon sensing a drop in said fire suppressant pressure; and said signal causing said circuit breaker to cease communicating said electricity to said electric circuit, whereby an emitting of said fire suppressant anywhere along said circuit will cause a disconnection of electricity from said electric circuit.

10. The cable system of claim 9, additionally comprising:
said internal cavity viewable through a viewing window; and confirmation of a presence of said pressurized reservoir of a fire suppressant within said internal cavity being discernable through said viewing window.

11. The cable system of claim 10, additionally comprising:
apertures running sequentially along said sheath from said first end of said cable to said second end of said cable;
said apertures defining passages between said axial pathway of said sheath and areas surrounding an exterior of said sheath; and
said fire suppressant emitted from said fluid conduit within said sheath communicable to said areas surrounding said exterior of said sheath, through said passages.

12. The cable system of claim 9 additionally comprising:
apertures running sequentially along said sheath from said first end of said cable to said second end of said cable;
said apertures defining passages between said axial pathway of said sheath and areas surrounding an exterior of said sheath; and
said fire suppressant emitted from said fluid conduit within said sheath communicable to said areas surrounding said exterior of said sheath, through said passages.

13. The cable system of claim 9, wherein said circuit breaker engaged with said electrically conductive wires at said first end of said cable is one of a plurality of circuit breakers connected with an electric buss of a circuit breaker panel; and said sealed connection with a pressurized supply of fire suppressant at said first end of said cable is located within said breaker panel housing said electric buss.

14. The cable system of claim 8, additionally comprising:
said internal cavity viewable through a viewing window; and confirmation of a presence of said pressurized reservoir of a fire suppressant within said internal cavity being discernable through said viewing window.

15. The cable system of claim 8, additionally comprising:
apertures running sequentially along said sheath from said first end of said cable to said second end of said cable;
said apertures defining passages between said axial pathway of said sheath and areas surrounding an exterior of said sheath; and
said fire suppressant emitted from said fluid conduit within said sheath communicable to said areas surrounding said exterior of said sheath, through said passages.

16. A cable system comprising:
a cable, said cable having a sheath with an axial pathway running a length of said cable between a first end of said cable and a second end of said cable;

said cable having one or a plurality of electrically conductive wires running through said axial pathway of said sheath for said length of said cable;

said cable having a fluid conduit engaged with or within said sheath and running said length of said cable, said fluid conduit having a sidewall surrounding an axial passage thereof;

wherein said length of said cable is engageable to communicate electricity through said conductive wires between said first end and said second end of said cable and to concurrently communicate a fire suppressant within said fluid conduit, between said first end of said cable and said second end of said cable;

said cable engaged in an electric circuit for carrying electricity over said electrically conductive wires;

said electrically conductive wires at said first end of said cable, engaged with a circuit breaker communicating said electricity to said electrically conductive wires;

said axial passage of said fluid conduit at said first end of said cable, in a sealed connection with a pressurized supply of fire suppressant;

a pressure sensor connected with said axial passage, said pressure sensor sensing a fire suppressant pressure of said pressurized supply of fire suppressant, within said axial passage;

said pressure sensor configured to communicate a signal to said circuit breaker upon sensing a drop in said fire suppressant pressure; and said signal causing said circuit breaker to cease communicating said electricity to said electric circuit, whereby an emitting of said fire suppressant anywhere along said circuit will cause a disconnection of electricity from said electric circuit.

17. The cable system of claim 16, wherein said circuit breaker engaged with said electrically conductive wires at said first end of said cable is one of a plurality of circuit breakers connected with an electric buss of a circuit breaker panel; and said sealed connection with a pressurized supply of fire suppressant at said first end of said cable is located within said breaker panel housing said electric buss.

18. A cable system comprising:

a cable, said cable having a sheath with an axial pathway running a length of said cable between a first end of said cable and a second end of said cable;

said cable having one or a plurality of electrically conductive wires running through said axial pathway of said sheath for said length of said cable;

said cable having a fluid conduit engaged with or within said sheath and running said length of said cable, said fluid conduit having a sidewall surrounding an axial passage thereof;

wherein said length of said cable is engageable to communicate electricity through said conductive wires between said first end and said second end of said cable and to concurrently communicate a fire suppressant within said fluid conduit, between said first end of said cable and said second end of said cable;

said electrically conductive wires having an insulation coating circumferentially engaged thereon, said insulation having a first melting temperature; and said sidewall of said fluid conduit being formed of material having a second melting temperature, said first melting temperature exceeding said second melting temperature, whereby said sidewall of said fluid conduit only melts at a location along said length of said cable where a temperature of said conductive wires at said location, exceeds said second melting temperature;

said cable engaged in an electric circuit for carrying electricity over said electrically conductive wires;

said electrically conductive wires at said first end of said cable, engaged with a circuit breaker communicating said electricity to said electrically conductive wires;

said axial passage of said fluid conduit at said first end of said cable in a sealed connection with a pressurized supply of fire suppressant;

a pressure sensor connected with said axial passage, said pressure sensor sensing a fire suppressant pressure of said pressurized supply of fire suppressant, within said axial passage;

said pressure sensor configured to communicate a signal to said circuit breaker upon sensing a drop in said fire suppressant pressure; and said signal causing said circuit breaker to cease communicating said electricity to said electric circuit, whereby an emitting of said fire suppressant anywhere along said circuit will cause a disconnection of electricity from said electric circuit.

19. The cable system of claim 18, wherein said circuit breaker engaged with said electrically conductive wires at said first end of said cable is one of a plurality of circuit breakers connected with an electric buss of a circuit breaker panel; and said sealed connection with a pressurized supply of fire suppressant at said first end of said cable is located within s said breaker panel housing said electric buss.

20. A cable system comprising:

a cable, said cable having a sheath with an axial pathway running a length of said cable between a first end of said cable and a second end of said cable;

said cable having one or a plurality of electrically conductive wires running through said axial pathway of said sheath for said length of said cable;

said cable having a fluid conduit engaged with or within said sheath and running said length of said cable, said fluid conduit having a sidewall surrounding an axial passage thereof; and wherein said length of said cable is engageable to communicate electricity through said conductive wires between said first end and said second end of said cable and to concurrently communicate a fire suppressant within said fluid conduit, between said first end of said cable and said second end of said cable;

apertures running sequentially along said sheath from said first end of said cable to said second end of said cable;

said apertures defining passages between said axial pathway of said sheath and areas surrounding an exterior of said sheath; and said fire suppressant emitted from said fluid conduit within said sheath communicable to said areas surrounding said exterior of said sheath, through said passages.

21. A cable system comprising:

a cable, said cable having a sheath with an axial pathway running a length of said cable between a first end of said cable and a second end of said cable;

said cable having one or a plurality of electrically conductive wires running through said axial pathway of said sheath for said length of said cable;

said cable having a fluid conduit engaged with or within said sheath and running said length of said cable, said fluid conduit having a sidewall surrounding an axial passage thereof;

wherein said length of said cable is engageable to communicate electricity through said conductive wires between said first end and said second end of said cable and to concurrently communicate a fire suppressant within said fluid conduit, between said first end of said cable and said second end of said cable;

said electrically conductive wires at one end of said cable, engageable with a junction box;

said junction box having opposing openings on opposite sides of an interior cavity of said junction box;

a pathway for said fluid conduit running through said junction box, said pathway running through said opposing openings and through area of an interior of said junction box in-between said openings;

a portion of said fluid conduit positioned along said pathway being located in said area of said interior of said junction box;

said electrically conductive wires having an insulation coating circumferentially engaged thereon, said insulation having a first melting temperature;

said fluid conduit having a second melting temperature, said first melting temperature exceeding said second melting temperature; and said portion of said fluid conduit in said area of said interior of said junction box melting when a temperature in said interior of said junction box equals or exceeds said first melting temperature, said portion of said fluid conduit upon said melting initiating an emission of said fire suppressant from within said fluid conduit.

22. The cable system of claim 21, additionally comprising:
- apertures running sequentially along said sheath from said first end of said cable to said second end of said cable;
- said apertures defining passages between said axial pathway of said sheath and areas surrounding an exterior of said sheath; and
- said fire suppressant emitted from said fluid conduit within said sheath communicable to said areas surrounding said exterior of said sheath, through said passages.

23. The cable system of claim 22, additionally comprising:
- said cable engaged in an electric circuit for carrying electricity over said electrically conductive wires;
- said electrically conductive wires at said first end of said cable, engaged with a circuit breaker communicating said electricity to said electrically conductive wires;
- said axial passage of said fluid conduit at said first end of said cable, in a sealed connection with a pressurized supply of fire suppressant;
- a pressure sensor connected with said axial passage, said pressure sensor sensing a fire suppressant pressure of said pressurized supply of fire suppressant, within said axial passage;
- said pressure sensor configured to communicate a signal to said circuit breaker upon sensing a drop in said fire suppressant pressure; and
- said signal causing said circuit breaker to cease communicating said electricity to said electric circuit, whereby an emitting of said fire suppressant anywhere along said circuit will cause a disconnection of electricity from said electric circuit.

24. The cable system of claim 22, wherein said circuit breaker engaged with said electrically conductive wires at said first end of said cable is one of a plurality of circuit breakers connected with an electric buss of a circuit breaker panel; and
- said sealed connection with a pressurized supply of fire suppressant at said first end of said cable is located within said breaker panel housing said electric buss.

25. The cable system of claim 21, additionally comprising:
- said cable engaged in an electric circuit for carrying electricity over said electrically conductive wires;
- said electrically conductive wires at said first end of said cable, engaged with a circuit breaker communicating said electricity to said electrically conductive wires;
- said axial passage of said fluid conduit at said first end of said cable, in a sealed connection with a pressurized supply of fire suppressant;
- a pressure sensor connected with said axial passage, said pressure sensor sensing a fire suppressant pressure of said pressurized supply of fire suppressant, within said axial passage;
- said pressure sensor configured to communicate a signal to said circuit breaker upon sensing a drop in said fire suppressant pressure; and
- said signal causing said circuit breaker to cease communicating said electricity to said electric circuit, whereby an emitting of said fire suppressant anywhere along said circuit will cause a disconnection of electricity from said electric circuit.

* * * * *